United States Patent
Konno et al.

[19]

[11] Patent Number: 6,031,687
[45] Date of Patent: Feb. 29, 2000

[54] DISK TABLE IN MAGNETIC DISK DRIVE

[75] Inventors: Makoto Konno; Hisashi Shibata; Toshinori Kurosaka, all of Yamagata, Japan

[73] Assignee: Mitsumi Electric Co., Ltd., Tokyo, Japan

[21] Appl. No.: 09/019,590

[22] Filed: Feb. 6, 1998

[30] Foreign Application Priority Data

Feb. 7, 1997 [JP] Japan ...................................... 9-025636

[51] Int. Cl.[7] ................................................. G11B 17/028
[52] U.S. Cl. ..................................... 360/99.12; 360/99.04; 360/99.05; 360/99.08
[58] Field of Search ............................. 360/99.12, 99.04, 360/99.08, 99.05

[56] References Cited

U.S. PATENT DOCUMENTS

| | | | |
|---|---|---|---|
| 4,855,850 | 8/1989 | Nagaoka et al. | 360/99.12 |
| 4,903,155 | 2/1990 | Maekawa et al. | 360/99.08 |
| 5,103,358 | 4/1992 | Munekata | 360/99.12 X |
| 5,121,272 | 6/1992 | Maekawa et al. | 360/99.12 |
| 5,798,886 | 8/1998 | Komatsu et al. | 360/99.12 X |

FOREIGN PATENT DOCUMENTS 9-91814  4/1997  Japan.

*Primary Examiner*—John H. Wolff
*Attorney, Agent, or Firm*—Whitham, Curtis & Whitham

[57] ABSTRACT

A disk table in a magnetic disk drive is disclosed. The disk table comprises a disk table body having an opening, a chucking arm made of an elastic body, where one end of the chucking arm is fixed on a lower face of the disk table body and the other end of the chucking arm is set free, a chucking roller disposed on the other fee end of the chucking arm, where the chucking roller is protruded from an upper face of the disk table through the opening, and a stopper provided on the lower face of the disk table in the vicinity of the free end of the chucking arm, wherein the chucking arm is freely floatable in vertical direction, and the amount of separation of the free end of the chucking arm from the lower face of the disk table body is restricted by stopper when the chucking roller is urged downwards. The restricted amount of displacement of the free end of the chucking arm is set such that the chucking arm would not deform plastically, or such that the chucking roller would not slip off or remove from said opening of the disk table body.

11 Claims, 10 Drawing Sheets

DISK TABLE IN MAGNETIC DISK DRIVE

BACKGROUND OF THE INVENTION

1. Technical Field of the Invention

The present invention relates to a disk table chucking a magnetic disk, in particular, for use in 3.5-inch floppy disk drive.

2. Related art

As shown in FIGS. 11 and 12, a conventional magnetic disk (floppy disk) drive DD motor is designed to be disposed on a lower surface of a frame of a magnetic disk drive (the surface opposite to the surface on the magnetic disk side).

That is, in FIGS. 11 and 12, a DD motor 1 has a printed board 3 disposed on a fame 2, a spindle shaft 4, a rotor 5, and a disk table 6.

The printed board 3 has a coil (not shown) formed of a conductive pattern on a surface thereof.

The spindle shaft 4 is not only inserted into a tough hole formed in the frame 2 and the printed board 3, but also supported by a bearing 4a so as to be vertical and rotatable with respect to the frame 2.

The rotor 5 is set into the lower end portion of the spindle shaft 4, and has a circular rotor case 5a that has a flange portion extending toward the frame 2 from the circumferential edge of the rotor case, a ring-like rotor magnet 5b mounted on the frame 2 side of the rotor case 5a, and a rotational direction detecting index magnet 5c mounted on the outer circumferential surface of the rotor case 5a.

The disk table 6 is disposed opposite to the rotor 5 with the frame 2 interposed therebetween, and is mounted onto an upper end portion of the spindle shaft 4. The upper surface of the disk table 6 protrudes, and not only supports a magnetic disk 7, but also has a chucking plate 8 formed of a magnetic substance for chucking the magnetic disk 7. AH shown in FIG. 12, one end of the chucking arm 9 for chucking the magnetic disk 7 is oscillatably supported on the circumferential edge of the upper surface of the disk table 6 by a support pin 9a. A roller 9b engageable with a window 7b of a hub 7a of the magnetic disk 7 is rotatable disposed on the other end of the chucking arm 9.

According to the thus constructed magnetic disk drive DD motor 1, the mantic disk 7 is fixed and held on the disk table 6 while disposed on the disk table 6 and chucked by the chucking plate 8.

When a drive current is applied to the coil provided on the printed board 3 under this condition, a magnetic field generated in the coil acts mutually with a magnetic field of the rotor magnet 5b of the rotor 5, so that the rotor 5 rotates together with the spindle shaft 4. Then, the chucking roller 9b of the chucking arm 9 engages with the window 7b of the hub 7a of the magnetic disk 7, so that the magnetic disk 7 is driven to rotate.

However, in the thus constructed magnetic disk drive DD motor 1, the rotor 5 and the disk table 6 are not only formed in separate pieces, but also mounted onto the spindle shaft 4 so as to interpose the frame 2 therebetween.

Further, the rotor 5 is not only set into the spindle shaft 4 by fixing screws, but also has the rotor magnet 5b and the index magnet 5c, which are formed independently of each other, attached thereto by an adhesive or the like.

Still further, the chucking plate 8 is mounted on the disk table 6 with an adhesive or the like, and one end of the chucking arm 9 for chucking the magnetic disk 7 is supported on the disk table 6 with the support pin 9a so as to be oscillatable, e.g., by self-locking or the like.

Therefore, the number of parts of the DD motor 1 as a whole is increased, which in turn has imposed the problem of elevated parts and assembling costs.

To solve the above problem, the present applicant separately proposed another chucking arm mechanism in Japanese Patent Publication No. 9-91814. As shown in FIG. 13, only one end of a chucking arm 9' is fired in a cantilever manner with the other end portion thereof set free and the chucking roller 9b' is engaged with the neighboring portion of such free end portion.

However, in this case, there is a fear that the chucking roller can sink so excessively into an opening formed in the disk table body, with the result that the chucking arm can be deformed plastically, and or the chucking roller can slip off or can be removed.

SUMMARY OF THE INVENTION

The present invention has been made in view of the aforementioned circumstances. The object of the present invention is therefore to provide a disk table in a magnetic disk drive that not only can reduce parts and costs as well as assembling costs with a simple construction but also can be enhance driving reliability of the magnetic disk drive.

To achieve the above object, according to the present invention, there is provided a disk table in a magnetic disk drive comprises a disk table body having an opening, a chucking arm made of an elastic body, where one end of the chucking arm is fixed on a lower surface of the disk table body and the other end of the chucking arm is set free, a chucking roller disposed on the other free end of the chucking arm, where the chucking roller is protruded from an upper surface of the disk table through the opening, and a stopper provided on the lower surface of the disk table in the vicinity of the free end of the chucking arm, wherein the chucking arm is freely floatable in vertical direction, and the amount of separation of the free end of the chucking arm from the lower surface of the disk table body is restricted by stopper when the chucking roller is urged downward. The restricted amount of displacement of the free end of the chucking arm is set such that the chucking arm would not deform plastically, or such that the chucking roller would not slip off or remove from said opening of the disk table body.

DETAILED DESCRIPTION OF THE EMBODIMENT

Now, description will be given below in detail of one embodiment of a disk table in a magnetic disk drive according to the present invention with reference to FIGS. 1 to 10. In particular, FIGS. 1 to 3 respectively show a rotor 11 for use in a 3.5-inch floppy disk drive, while the rotor 11 is formed integrally with a disk table 12. That is, a rotor case 13 for the rotor 11, which is shown in FIG. 4 as well, is made of a metal thin plate shield magnetic field, and is formed by press molding the metal thin plate into a disk shape. The central portion of the rotor case 13 is raised toward top face of the rotor case 13 (in FIGS. 1 and 4, toward this side) in a circular cup shape to thereby form a disk table body 14.

Figure 5:
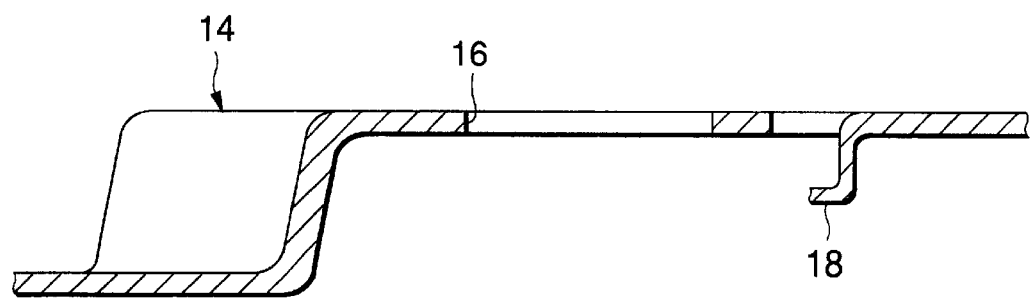
FIG. 5 is a section view taken along the line B—B shown in FIG. 4.

The disk table body 14 includes a circular hole 15 opened up in the central portion thereof, a substantially egg-shaped opening 16 formed on one side of the top face thereof, and two small holes 17 and 17 which are respectively opened up at positions which are rotated substantially by and angle of 90° clockwise from the opening 16 when viewed in a plan view thereof. Also, there is provided a stopper 18 which is situated adjacently to the opening 16 and on the opposite side of the small holes 17, 17. As shown in FIG. 5, to form the stopper 18, at the same time when the disk table 14 is formed by press molding, the blank material of the disk table, that is, the metal thin plate may be cut in the portion thereof corresponding to the disk table and may be extended and bent to the back face of the rotor case 13 (in FIG. 5, downwards), and further the leading end of the thus cut and bent portion may be bent toward the opening 16 (in FIG. 5, left side).

Figure 6:
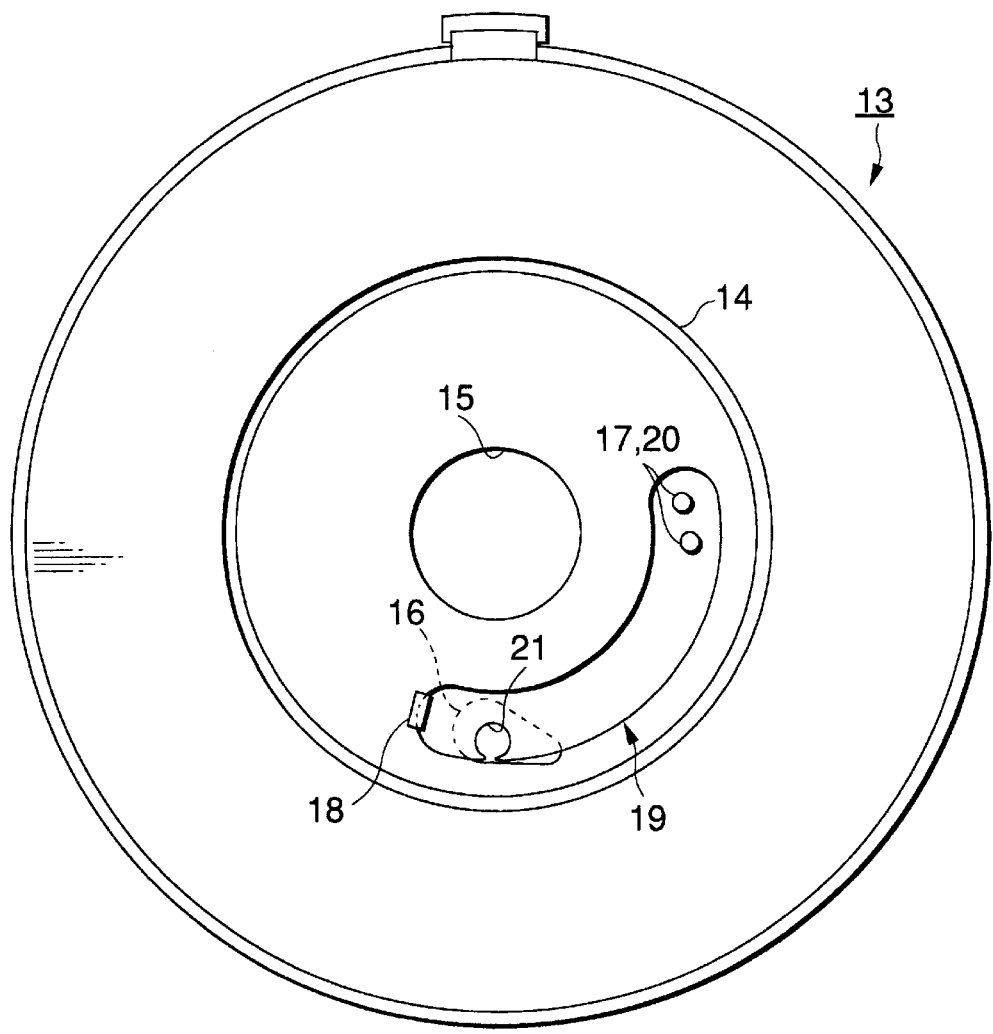
FIG. 6 is a bottom view of tie rotor case shown in FIG. 4, showing a sate thereof in which a chucking arm is combined with the rotor ease.

After then, as shown in FIG. 6, an arc-shaped chucking arm 19 made of an elastic thin plate is applied to the back surface of the disk table body 14. At the tine, not only two small holes 20, 20, which are respectively opened up in tie vicinity of one end portion of this chucking arm 19, are met with the small holes 17, 17 of the disk table body 14, but also the other end portion of the chucking arm 19 is inserted into the interior portion of the stopper 18. By the way, in the vicinity of the other end portion of the chucking arm 19, there is formed a hollowed circular-shaped notch 21 which is open in the direction of the end edge of the outer periphery of the chucking arm 19; and, the notch 21 is situated just inside the opening 16.

Figure 1:
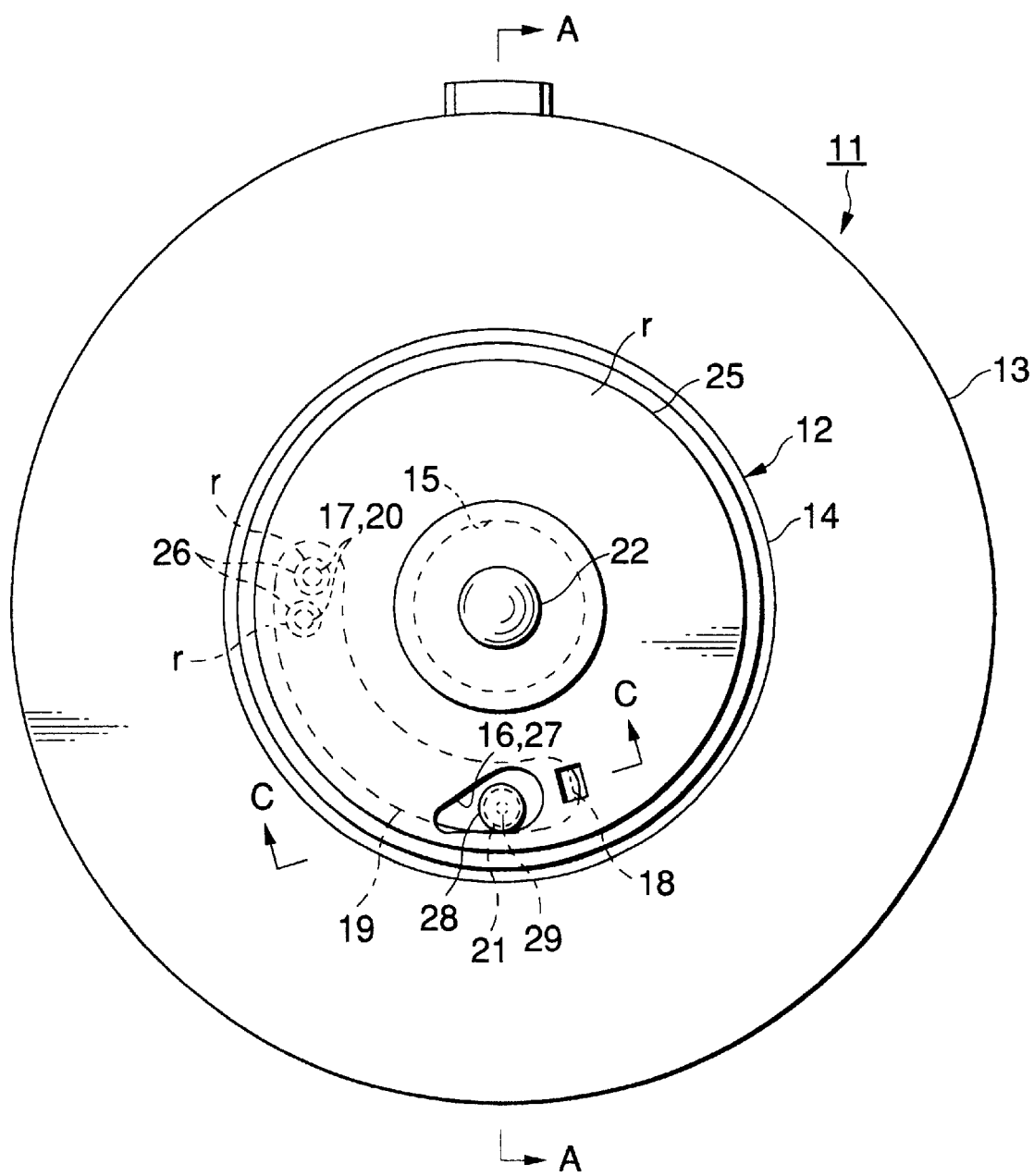
FIG. 1 is a plan view of a rotor in a magnetic disk drive, showing one embodiment of a disk table according to the present invention.
Figure 2:
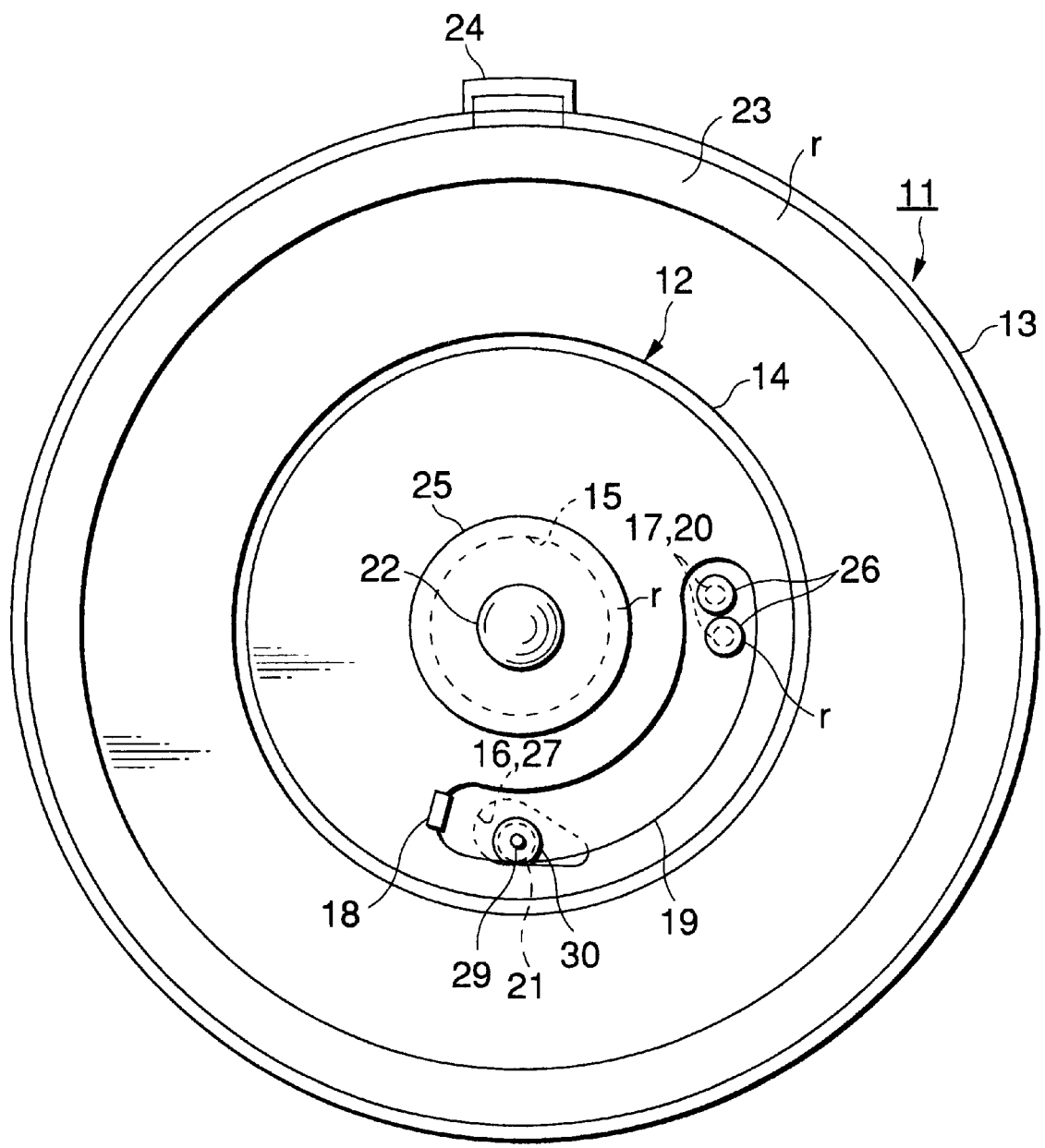
FIG. 2 is a bottom view of the rotor shown in FIG. 1.
Figure 3:
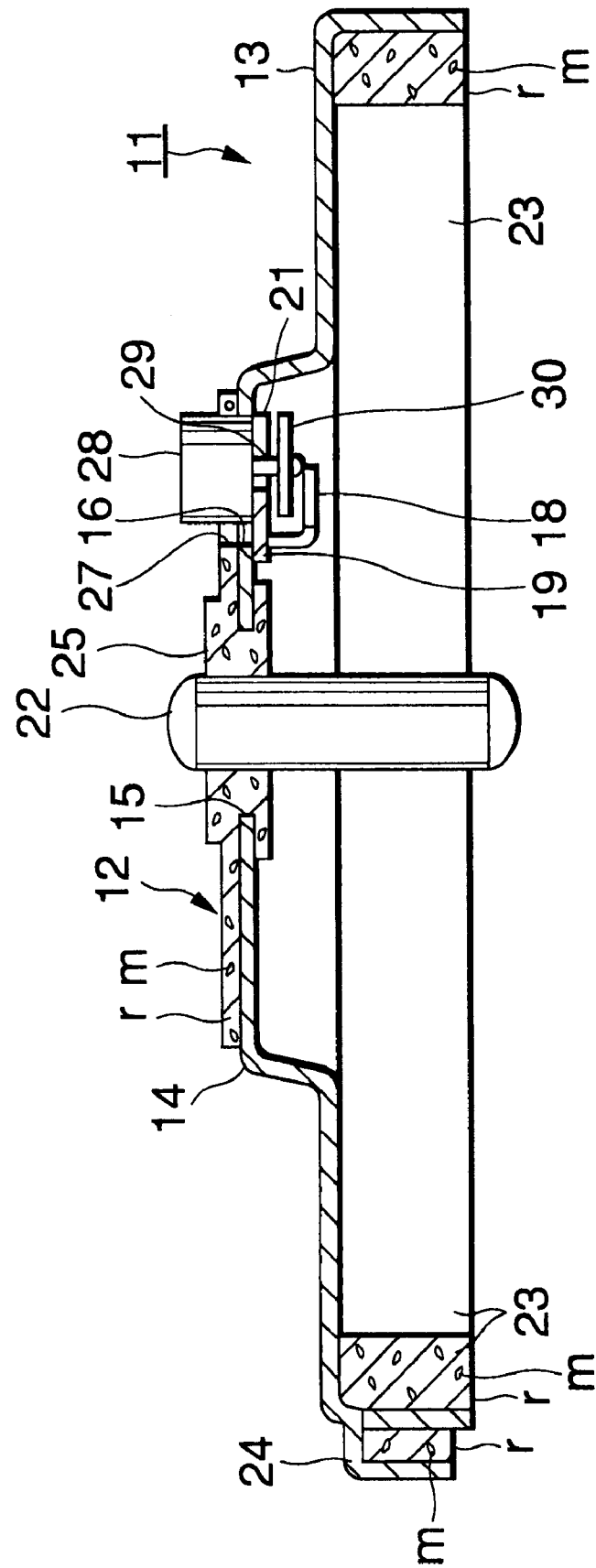
FIG. 3 is a section view taken along the line A—A shown in FIG. 1.
Figure 4:
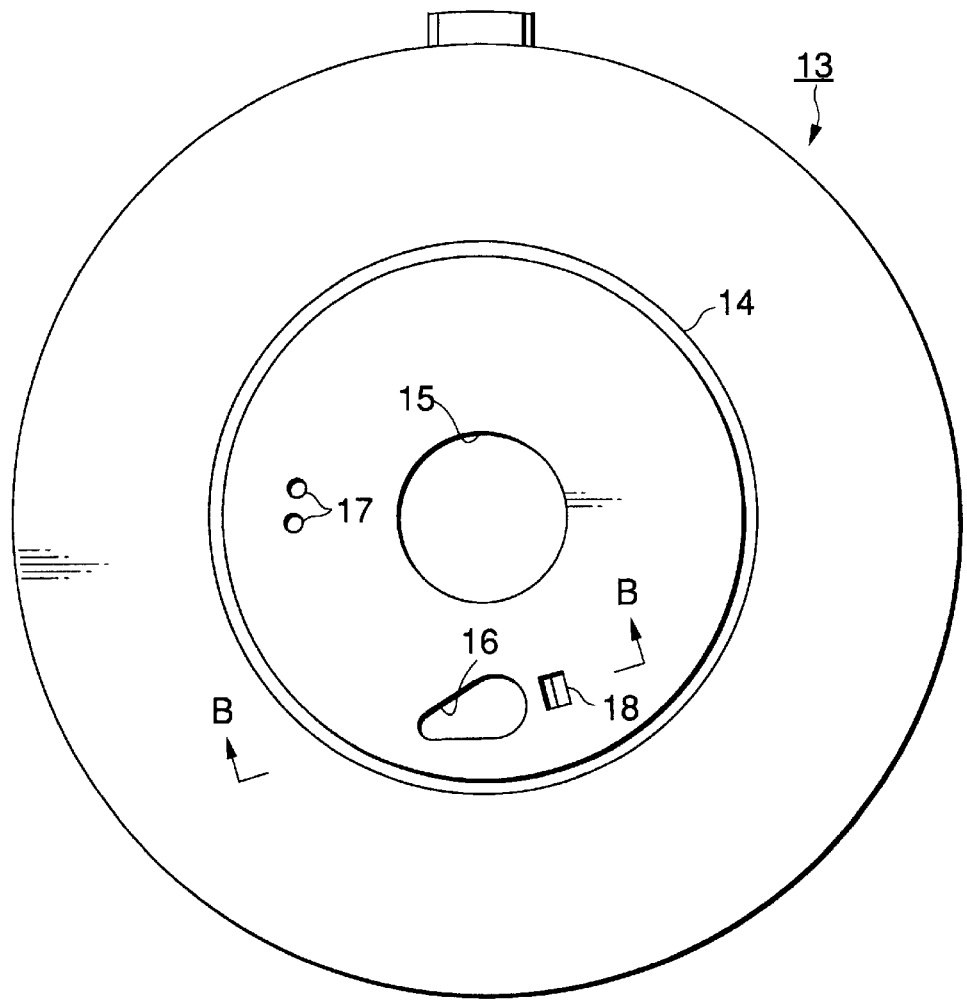
FIG. 4 is a plan view of a rotor case shown in FIG. 1.

As shown in FIGS. 1 to 3, after a spindle shaft 22 is disposed along the central axis of the rotor 11, resin r is molded onto the top and back faces of the rotor case 13 (disk table body 14) to thereby connect them uniformly. Here, magnetic material powder m is previously mixed in the resin r. Initially, the magnetic material powder m is not magnetized, and after the resin r is molded, a magnetic field is applied to the molding to thereby magnetize the magnetic material powder m.

Here, in the inner peripheral surface of the outer peripheral frame portion of the rotor case 13, a rotor magnet 23 is formed by the resin r containing therein the magnetized magnetic material powder m. Also, in a small chamber projectingly provided on one side of the outer peripheral frame portion, an index magnet 24 for detecting an angle of rotation is formed. Further, a chucking magnet 25 is formed on the both surfaces of the disk table body 14 through a circular hole 15 formed in the center of the disk table body 14. This chucking magnet 25 allows the spindle shaft 22 to be connected to the rotor case 13 (disk table body 14), thereby uniting them into an integral body.

Figure 7:
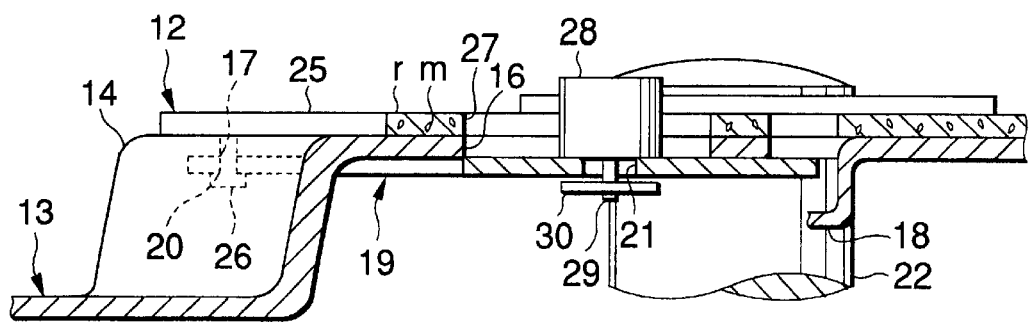
FIG. 7 is a section view taken along the line C—C shown in FIG. 1.

As shown in FIG. 7 as well, part of the resin r forming the chucking magnet 25 is also filled into the two small holes 17, 17 opened up in the disk table body 14 as well as into the two small holes 20, 20 opened up in the chucking arm 19, and further the thus inserted resin r flows out from the two small holes 20, 20 and spreads out onto the lower surface of the chucking arm 19, thereby firming two stake members 26 and 26 for the chucking arm 19. In this manner, one end of the chucking arm 19 is fitted with and is thereby integrally united with the disk table body 14 in a cantilever manner.

Also, the resin r is not filled into the opening 16 so that the opening 16 can be left as it is. That is, in the chucking magnet 25, there is formed an opening 27 which can be superimposed onto the opening 16. And, a chucking roller 28 is inserted into the openings 16 and 27. The chucking roller 28 includes a email-diameter shaft pin 29 which is so formed as to hang dawn along the central portion of the lower surface thereof. When the chucking roller 28 is inserted, the shaft pin 29 is inserted into the notch 21 of the chucking arm 19 and the chucking roller 28 is placed on the chucking arm 19. And, a washer 30 is put on the tip end of the shaft pin 29 which projects downwards from the lower surface of the chucking arm 19, and the leading end of the shaft pin 29 is crushed and staked. In this manner, the chucking roller 28 is floatably engaged within the notch 21 as well as within the openings 16 and 27. The upper end face of the chucking roller 28 in this state is upper than the upper surface of the chucking magnet 25.

Figure 8:
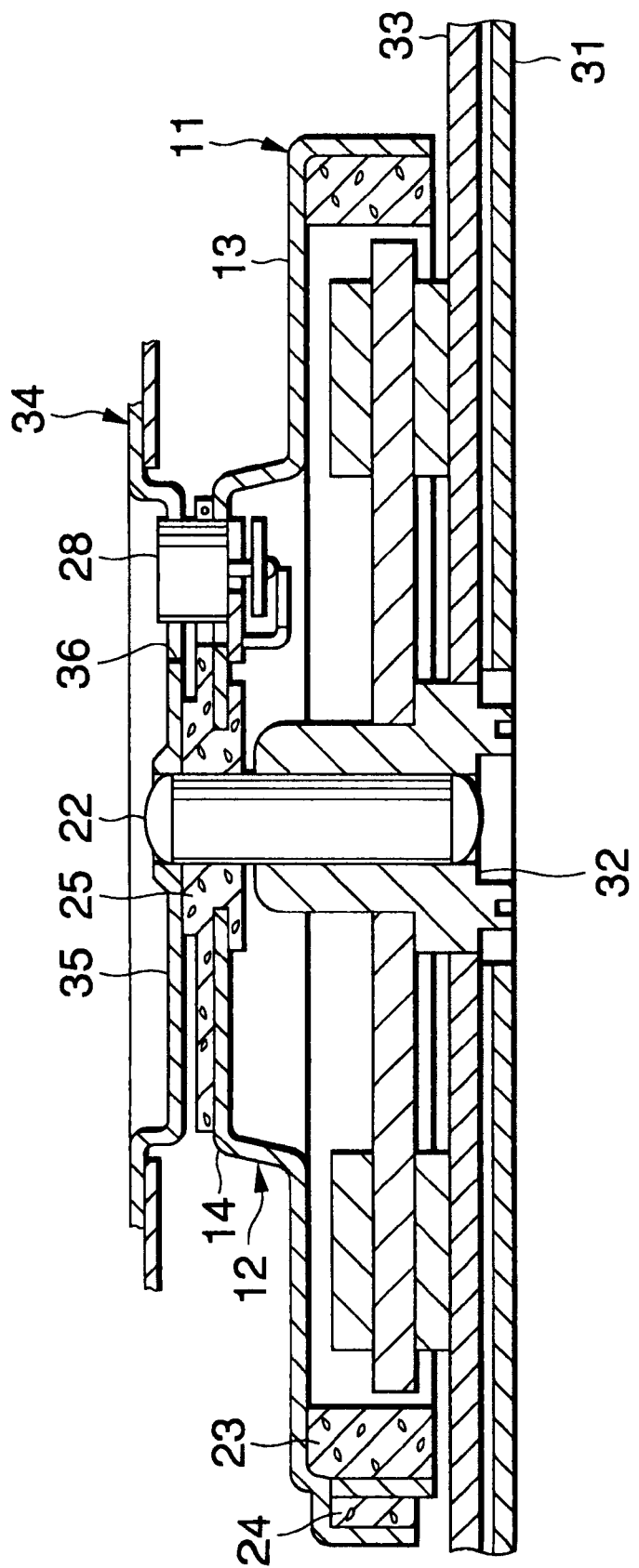
FIG. 8 is a ion view of the main portions of a 3.5-inch floppy disk drive with a 3.5-inch floppy disk engaged therewith.

The thus formed rotor 11 having a disk table integrated therewith, as shown in FIG. 8, is supported by a frame 31 for a 3.5-inch floppy disk drive, while the spindle shaft 22 of the rotor 11 is rotatably supported by a bearing 32. A printed board 33 is disposed on the inner surface of the frame 31.

If a 3.5-inch floppy disk 34 is disposed upward of the central portion of the disk table 12, then the metal hub 35 of the 3.5-inch floppy disk 34 is attracted by the chucking magnet 25 and is thereby abutted therewith and, at the same time, the chucking roller 28 is pressed down by the hub 35 and is thereby caused to sink downwards, which in turn bends the chucking arm 19 to thereby separate the free end portion of the chucking arm 19 from the disk table body 14.

Then, if a drive current is applied to a coil formed on the printed board 33, then a magnetic field is generated around the coil and the magnetic field acts on the rotor magnet 23 to thereby cause the rotor 11 to rotate clockwise when viewed from a plan view thereof. Here, since the chucking roller 28 is urged upwards due to the curve of the chucking arm 19, when the chucking roller 28 arrives at the position of a window 36 formed in the hub 35, then it is pushed upwards and is thereby engaged with the window 36. In this manner, the 3.5-inch floppy disk 34 is chucked and, after then, the 3.5-inch floppy disk 34 can be rotated together with the disk table 12.

Figure 9:
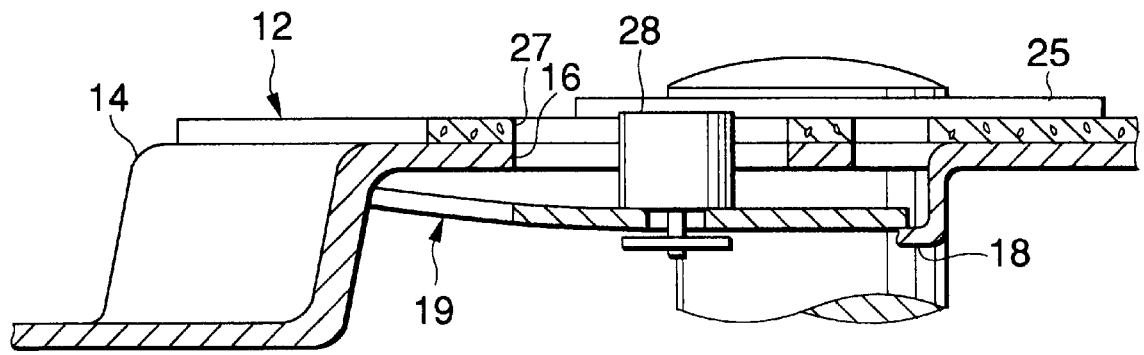
FIG. 9 is a section view taken along the line C—C shown in FIG. 1, showing a state in which a chucking roller sinks to the maximum.

As described the above, although the chucking roller 28 must be structured such that it can be operated to a certain degree in the thrust direction, if the chucking roller 28 sinks too much, then there arises a fear that the chucking arm 19 can be deformed plastically or the chucking roller 28 itself can slip off or can be removed from the notch 21. However, in the present disk table 12, as shown in FIG. 9, if the free end portion of the chucking arm 19 is separated to a certain degree from the disk table body 14 and the upper end face of the chucking roller 28 comes to a position slightly downward of the top face of the chucking magnet 26, then the fee end portion of the chucking arm 19 is secured with the stopper 18. This structure prevents not only the chucking roller 28 from sinking any further but also prevents the chucking arm 19 from being curved any further. That is, the plastic deformation of the chucking arm 19 can be prevented and the slippage or the removal of the chucking roller 28 can also be prevented.

Figure 10:
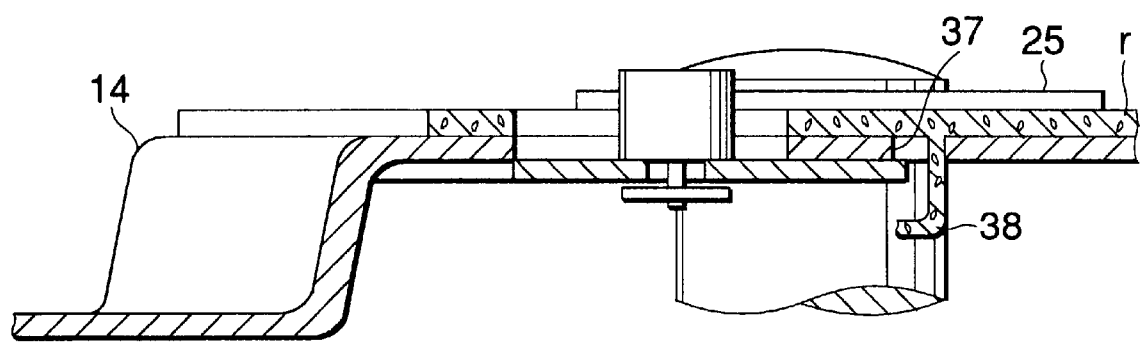
FIG. 10 is a section view of the main portions of a disk table according to another embodiment of the present invention.
Figure 11:
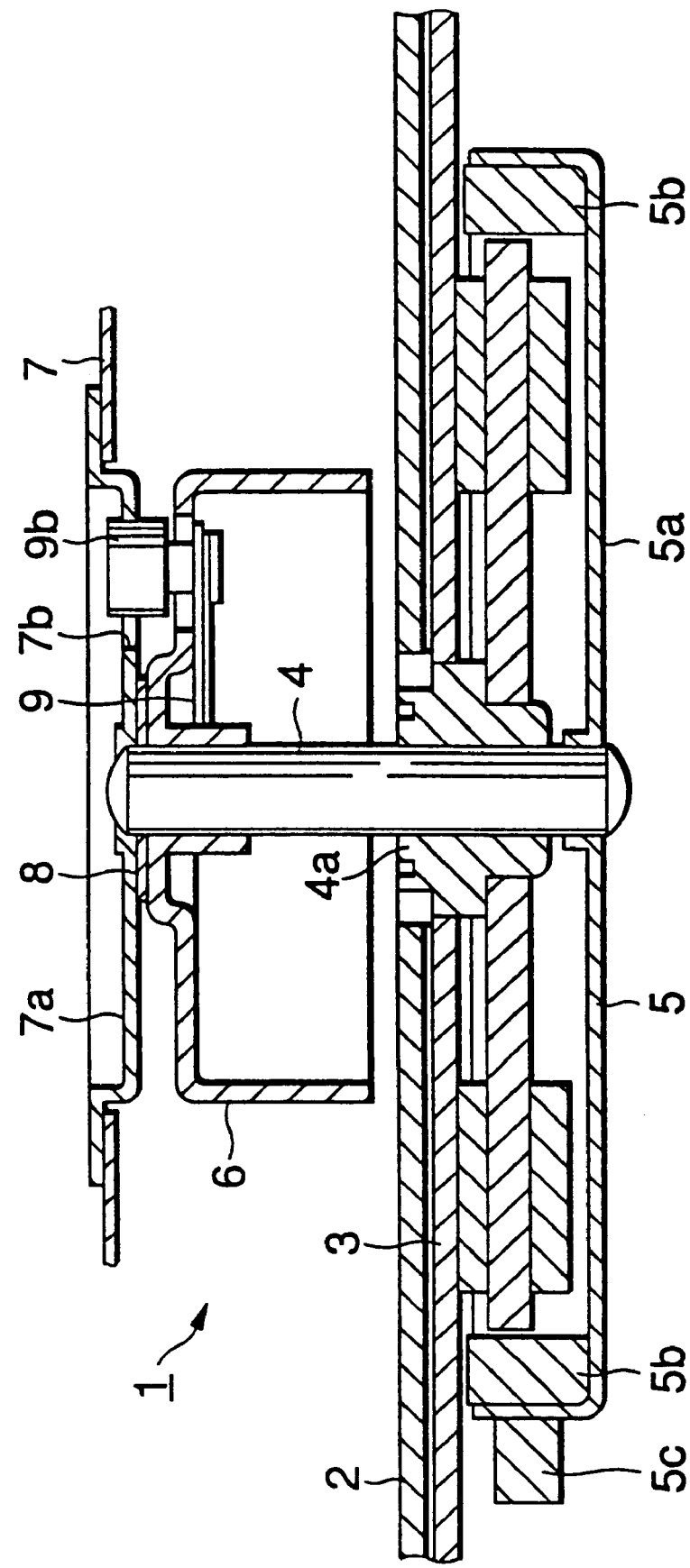
FIG. 11 is a vertical section view of a conventional disk table in a magnetic disk drive.
Figure 12:
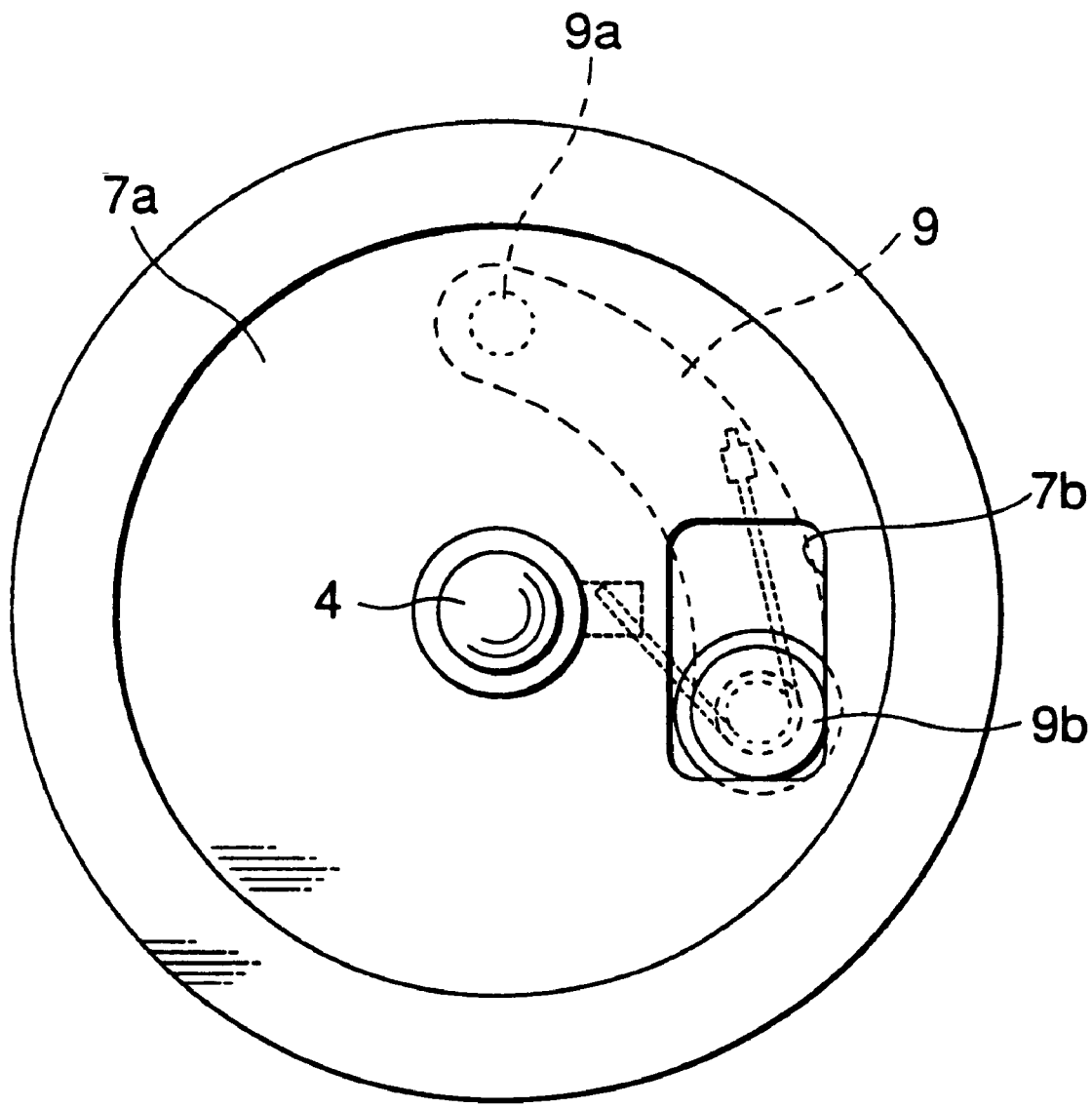
FIG. 12 is a plan view of a conventional disk table in a magnetic disk drive.
Figure 13:
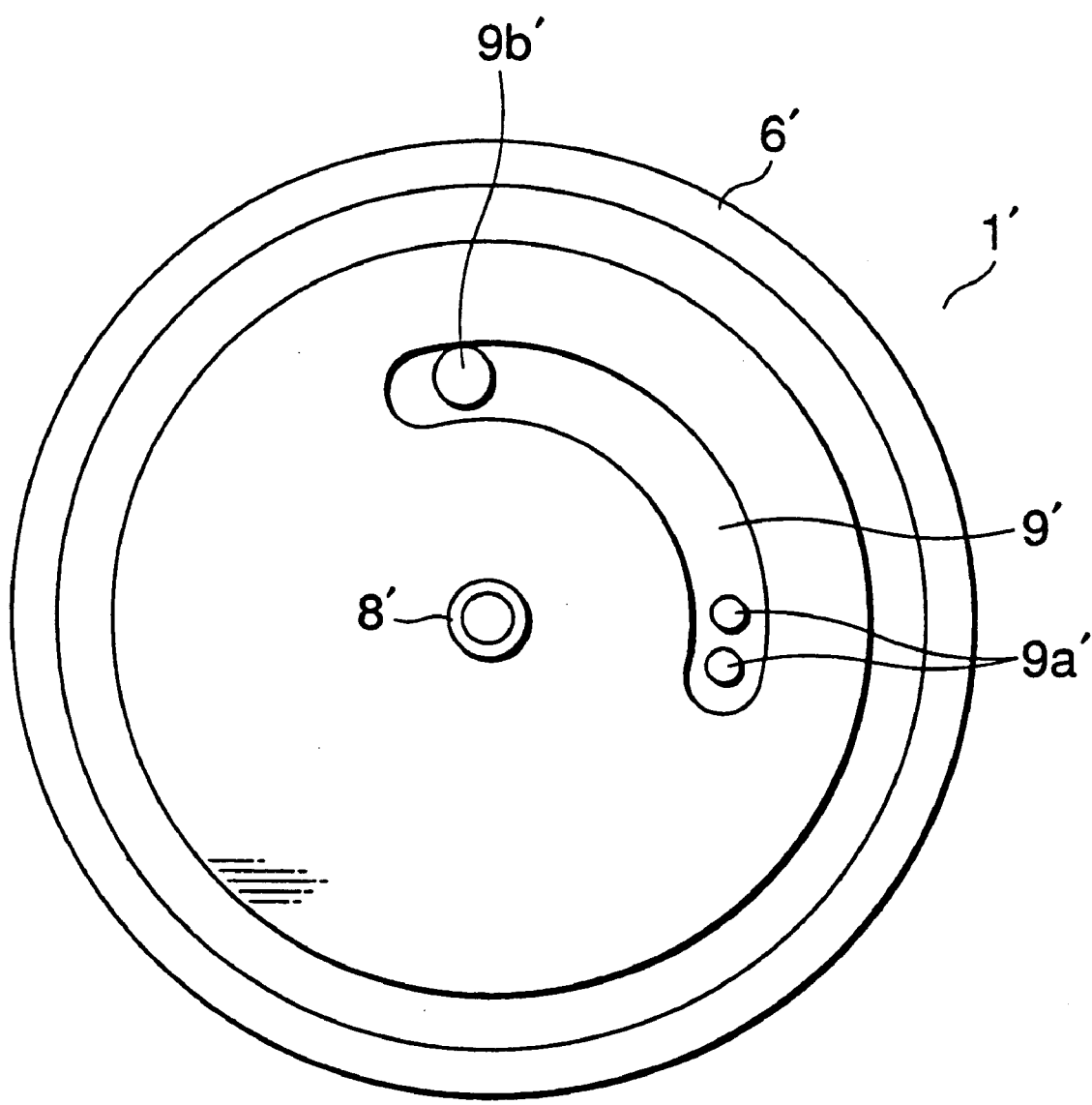
FIG. 13 is a bottom view of another conventional disk table in a magnetic disk drive.

Alternatively, as shown in FIG. 10, a hole 37 may be previously formed in the disk table body 14 and, when the resin r is molded, part of the mold r forming the chucking magnet 25 may be flown round to the back surface side of the disk table body 14, thereby forming a stopper 38.

Also, according to the present invention, varus changes and modifications are possible without departing from the scope and spirit of the invention and, of course, the present invention can cover such changes and modifications.

As has been described heretofore, according to the present invention, due to the fact that, if the chucking roller sinks to thereby curve the chucking arm to a certain degree, then the free end portion of the chucking arm is secured with the stopper, so that the chucking arm is prevented from being curved any further and the chucking roller is prevented from sinking any further. This makes it possible not only to prevent the plastic deformation of the chucking arm but also to prevent the slippage or removal of the chucking roller. As a result of this, the reliability of magnetic disk drive can be enhanced.

Also, due to fact that the fixed end of the chucking arm and disk table body are integrally formed with the resin portion, therefore not only the number of parts constituting a disk table can be reduced, which in turn contributes to reducing parts coats, but also the assembling steps as well as the assembling time, and hence contributes to reducing assembling costs.

What is claimed is:

1. A disk table in a magnetic disk drive comprising:
    a disk table body having an upper surface and a lower surface, and an opening;
    a chucking arm made of an elastic body having a first end and a second end, the first end being fixed on the lower surface of the disk table body, and the second end being upwardly and downwardly movable with respect to the lower surface of the disk table body;
    a chucking roller disposed proximate to the second end of the chucking arm and extending above the upper surface of the disk table body through the opening of the disk table body; and
    a stopper extending downward from the lower surface of the disk table body adjacent the opening of the disk table body, said stopper contacting the second end of the chucking arm and limiting the downward movement of the chucking arm when the chucking roller is urged downwards.

2. The disk table in the magnetic disk drive as set forth in claim 1, wherein the amount of movement of the second end of the chucking arm from the lower face of the disk table body is limited by the stopper such that the chucking arm can not deform plastically.

3. The disk table in the magnetic disk drive as set forth in claim 1, wherein the amount of movement of the second end of the chucking arm away from the lower face of the disk table is limited by the stopper so as to prevent the chucking roller from disengaging from said opening of the disk table body.

4. The disk table in the magnetic disk drive as set forth in claim 1, wherein said stopper is made of a same material of as said disk table body and molded integrally with the disk table body.

5. The disk table in the magnetic disk drive as set forth in claim 1, further comprising a spindle shaft disposed at a central portion of said disk table body and a res portion provided on the upper and lower surfaces of the disk table body to connect the disk table body and the spindle shaft uniformly, wherein said fired end of said chucking arm is integrally fitted on the lower face of the disk table body with the resin portion.

6. The disk table in the magnetic disk drive as set forth in claim 5, wherein the stopper is made of a same material of a said resin portion and a molded integrally with the resin portion.

7. The disk table in the magnetic disk drive as set forth in claim 6, wherein the amount of movement of the second end of the chucking arm away from the lower face of the disk table is restricted by the stopper so as to prevent the chucking roller from disengaging from said opening of the disk table body.

8. The disk table in the magnetic disk drive as set forth in claim 5, wherein said stopper is made of a same material as said disk table body and molded integrally with the disk table body.

9. The disk table in the magnetic disk drive as set forth in claim 1, wherein the downwardly extending stopper includes an extension, the extension contacts the second end of the chucking arm and limits the downward movement of the chucking arm when the chucking roller is urged downwards.

10. The disk table in the magnetic disk drive as set forth in claim 9, wherein the extension extends perpendicularly from the downwardly extending stopper.

11. The disk table in the magnetic disk drive as set forth in claim 9, wherein the extension extends perpendicularly from the downwardly extending stopper and is substantially parallel to the lower surface of the disk table body.

* * * * *